US006667119B2

(12) United States Patent
Ejiri et al.

(10) Patent No.: US 6,667,119 B2
(45) Date of Patent: Dec. 23, 2003

(54) MAGNETIC RECORDING MEDIUM COMPRISING MAGNETIC LAYERS, THE COERCIVE FORCE THEREOF SPECIFICALLY RELATED TO SATURATION MAGNETIC FLUX DENSITY

(75) Inventors: Kiyomi Ejiri, Kanagawa (JP); Minoru Sueki, Kanagawa (JP)

(73) Assignee: Fuji Photo Film Co., Ltd., Kanagwa (JP)

( * ) Notice: Subject to any disclaimer, the term of this patent is extended or adjusted under 35 U.S.C. 154(b) by 0 days.

(21) Appl. No.: 09/950,694

(22) Filed: Sep. 13, 2001

(65) Prior Publication Data

US 2002/0055019 A1 May 9, 2002

(30) Foreign Application Priority Data

Sep. 14, 2000 (JP) ...................................... P.2000-280054

(51) Int. Cl.$^7$ ............................... G11B 5/66; G11B 5/70
(52) U.S. Cl. ...................... 428/694 TM; 428/694 BM; 428/694 BN
(58) Field of Search .................. 428/694 TM, 694 BM, 428/694 BN

(56) References Cited

U.S. PATENT DOCUMENTS

| 4,396,668 A | * | 8/1983 | Saito et al. | |
| 4,513,054 A | * | 4/1985 | Kitamoto et al. | |
| 4,851,288 A | * | 7/1989 | Ishikuro et al. | |
| 5,139,865 A | * | 8/1992 | Inaba et al. | |
| 5,370,932 A | * | 12/1994 | Inaba et al. | ................ 428/323 |
| 5,402,295 A | * | 3/1995 | Suzuki et al. | |
| 5,447,782 A | | 9/1995 | Inaba et al. | |
| 5,455,104 A | * | 10/1995 | Sekiguchi et al. | |
| 5,518,804 A | | 5/1996 | Mizuno et al. | |
| 5,599,635 A | * | 2/1997 | Katori et al. | ................ 428/692 |
| 5,744,234 A | * | 4/1998 | Kitaori et al. | ................ 428/332 |
| 6,150,046 A | * | 11/2000 | Watanabe et al. | ........ 428/694 R |
| 6,203,934 B1 | * | 3/2001 | Naoe et al. | ............. 428/694 B |

* cited by examiner

Primary Examiner—H. Thi Le
(74) Attorney, Agent, or Firm—Sughrue Mion, PLLC

(57) ABSTRACT

A magnetic recording medium having on a support at least two magnetic layers that include an uppermost magnetic layer for recording information and a lower magnetic layer for recording servo signals, wherein the uppermost magnetic layer has a coercive force Hc(U) [KA/m] at most 265 times as much as a saturated magnetic flux density Bs[T] of a recording head used for information recording and the lower magnetic layer has a coercive force Hc(L) [KA/m] at least 159 times as much as the saturated magnetic flux density Bs[T] of the recording head used for information recording, thereby ensuring highly accurate servo write and elevation of recording density.

6 Claims, No Drawings

MAGNETIC RECORDING MEDIUM COMPRISING MAGNETIC LAYERS, THE COERCIVE FORCE THEREOF SPECIFICALLY RELATED TO SATURATION MAGNETIC FLUX DENSITY

FIELD OF THE INVENTION

The present invention relates to a magnetic recording medium for recording information and writing servo signals.

BACKGROUND OF THE INVENTION

In magnetic recording systems for data storage, signals for positioning (which are also referred to as servo signals hereinafter) are recorded on recording media for the purpose of elevating track densities. To the positioning problem, various approaches have been made. For instance, there have been proposed the method of forming holes in a magnetic layer and detecting variations in light reflectivity, the method of forming a track for the exclusive use of servo signals on the magnetic layer surface of a recording medium, and the method of forming holes in the backing layer of a recording medium and detecting variations in light reflectivity. According to the former two methods, however, the servo track formed causes a reduction in data recording area to result in a capacity decrease, and the positioning accuracy decreases due to a distance between the data track and the servo track. The latter method has a drawback of being inferior in accuracy of the servo write.

With the intention of solving those problems, there has been made a proposal to provide at least two magnetic layers, adjust their coercive forces to satisfy the relationship that Hc of an upper layer<Hc of a lower layer (wherein Hc stands for a coercive force), so as to record different signals in these magnetic layers respectively (see JP-A-6-139555, which corresponds to U.S. Pat. No. 5,518,804). However, the upper layer Hc in the range disclosed is too low to attain high-density recording.

SUMMARY OF THE INVENTION

An object of the invention is to provide a magnetic recording medium which is free of the aforementioned drawbacks and enables servo write with high accuracy and recording in higher density.

As a result of our intensive studies on magnetic recording media enabling highly accurate servo write and higher recording densities, we have attained the present invention.

More specifically, the invention solves the foregoing problem by the following magnetic recording media:

(1) A magnetic recording medium having on a support at least two magnetic layers which include an uppermost magnetic layer for recording information and a lower magnetic layer for recording servo signals, wherein the uppermost magnetic layer has a coercive force Hc(U) [KA/m] at most 265 times as much as a saturated magnetic flux density Bs[T] of a recording head used for information recording, and the lower magnetic layer has a coercive force Hc(L) [KA/m] at least 159 times as great as the saturated magnetic flux density Bs[T] of the recording head used for information recording. The Hc(U) and Hc(L) each represents coersive forces of the uppermost magnetic layer and the lower magnetic layer, respectively.

(2) The magnetic recording medium according to the foregoing item (1), wherein the coercive force of the uppermost magnetic layer is 140 KA/m or more.

(3) The magnetic recording medium according to the foregoing item (1), wherein the coercive force of the uppermost magnetic layer is from 158 KA/m to 316 KA/m.

(4) The magnetic recording medium according to any one of the foregoing items (1) to (3), wherein the uppermost magnetic layer has a thickness of from one-tenth to one time the shortest recording wavelength of information signals to be recorded in the uppermost magnetic layer and the lower magnetic layer has a thickness of 0.05 to 3 $\mu$m.

(5) The magnetic recording medium as described in any one of the foregoing items (1) to (4), wherein a non-magnetic layer containing a non-magnetic powder and having a thickness of 0.3 to 3 $\mu$m is provided underneath the magnetic layers and the lower magnetic layer has a thickness of 0.05 to 0.5 $\mu$m.

In order to provide an information recording layer capable of attaining higher recording density and to ensure highly accurate servo write in a magnetic recording system wherein servo signals are recorded, the magnetic recording medium of the invention has the following functions:

1) By forming the layer for servo write just under or indirectly under the information recording layer, the area of information recording is extended and the accuracy of servo is heightened.
2) By designing the magnetic layer so as to have high Hc and a small thickness, the recording density of information recording layer is increased.
3) By specifying the relation between the Hc of information recording layer, the Hc of servo wire layer and the saturated magnetic flux density Bs of a recording head, disappearance of servo signals is prevented and a good servo signal to noise ratio is achieved.
4) By further providing a non-magnetic under layer to reduce a thickness of the servo write layer itself, resolution of servo signals is improved.

DETAILED DESCRIPTION OF THE INVENTION

Suitable embodiments of the magnetic recording medium according to the invention are illustrated below in detail.

The term "saturated magnetic flux density" is also referred to as "Bs" hereinafter.

[Uppermost Magnetic Recording Layer]

The coercive force of the uppermost magnetic layer (Hc(U) [KA/m]) is at most 265 times, preferably at most 199 times, the Bs[T] of a recording head used for information recording. In particular, it is advantageous for the Hc(U) to be 140 KA/m or more, preferably from 158 KA/m (2,000 Oe) to 316 KA/m (4,000 Oe). When the Hc(U) is low, high-density information recording cannot be performed; while too high Hc(U) requires that the magnetic field of a recording head be increased and gives rise to easy erase of the servo signals recorded in the lower magnetic layer.

The suitable thickness of the uppermost magnetic layer is preferably from one-tenth to once, more preferably from one-eighth to three-fifths, the shortest recording wavelength of information signals to be recorded. When the uppermost magnetic layer is too thin, the information signal output becomes too low and servo signals are liable to be erased by a recording head. When the uppermost magnetic layer is too thick, on the other hand, the resolution of information signals is lowered and intensification of the magnetic field of a head becomes necessary for overwrite, under the influence of which servo signals are liable to be erased.

When the magnetic layer is constituted of two layers, the upper magnetic layer is the uppermost magnetic layer; while, when the magnetic layer is constituted of three or more layers, the layer disposed at the top is the uppermost magnetic layer.

[Lower Magnetic Layer]

The coercive force of the lower magnetic layer (Hc(L) [KA/cm]) is at least 159 times, preferably at least 199 times, the Bs[T] of a recording head used for information recording. The upper limit of Hc(L) is determined depending on the servo recording head capacity, but in actuality it is appropriate that the Hc(L) is 553 KA/m (7,000 Oe) at the greatest.

The thickness of the lower magnetic layer is preferably from 0.05 to 3 μm, more preferably from 0.05 to 2 μm, still more preferably from 0.1 to 1 μm. When the lower magnetic layer is too thin, the servo signal intensity is lowered. When the layer is too thick, a drop in resolution is caused.

When at least three magnetic layers exist as magnetic layers, the magnetic layer(s) other than the uppermost magnetic layer and the servo write layer (i.e., lower magnetic layer for recording servo signals) preferably has/have a lower Hc than the servo write layer.

[Non-magnetic Layer]

When the lower magnetic layer is rendered thin, it is possible to ensure smoothness in the magnetic layer by providing a non-magnetic layer containing a non-magnetic powder and having a thickness of 0.3 to 3 μm underneath the magnetic layer, and whereby higher-density recording becomes possible.

[Magnetic Powder]

Examples of magnetic powders usable in magnetic layers including the uppermost magnetic layer and the lower magnetic layer include fine powders of permanent magnet materials capable of attaining the Hc values required for the invention, such as acicular alloy powders containing Fe as the main component, hexagonal ferrite powders, Sm—Co alloy powders, Fe—Pt alloy powders and Mn—Al alloy powders. As to the particle sizes of magnetic powders, it is appropriate that acicular particles have their average major axis length in the range of 0.03 to 0.15 μm, preferably 0.04 to 0.1 μm, and their crystallite size in the range of 70 to 180 Å, preferably from 80 to 150 Å, tabular particles of hexagonal ferrite have their tabular diameter in the range of 10 to 50 nm, preferably 15 to 40 nm, and their tabular thickness in the range of 5 to 15 nm, preferably 7 to 12 nm, and granular particles have their diameter in the range of 5 to 50 nm, preferably 8 to 35 nm.

The Hc values of magnetic layers depend on magnetic characteristics of magnetic powders used therein. In order to control Hc(U) of the uppermost magnetic layer so as to be in the range specified above, it is therefore preferred to use a magnetic powder ranging in coercive force from 158 to 316 KA/m. On the other hand, for controlling the Hc(L) of the lower magnetic layer so as to be in the range specified above, magnetic powders ranging in coercive force from 190 to 553 KA/m can be preferably used.

For the Hc adjustment of magnetic powders, known arts can be adopted. For instance, in the case of acicular Fe alloy powders, the desired Hc can be attained by controlling the amount of Co added, or by changing the acicular ratio. In the case of hexagonal ferrite, on the other hand, Hc adjustment can be accomplished by controlling the amounts of impurities added.

[Binder]

The binders used for the magnetic layers (uppermost and lower layers) and the non-magnetic layer in the invention may be any of known thermoplastic resins, thermosetting resins, reactive resins or mixtures of these resins. The thermoplastic resins usable as binders include resins whose glass transition temperatures are in the range of −100 to 150° C., whose number average molecular weights are in the range of 1,000 to 200,000, preferably 10,000 to 100,000, and whose polymerization degrees are in the range of about 50 to about 1,000. Examples of such thermoplastic resins include homopolymers and copolymers containing constituent units derived from monomers such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether, polyurethane resins and various resins of rubber type. Examples of the thermosetting resins and reactive resins include phenol resin, epoxy resin, polyurethane resin, urea resin, melamine resin, alkyd resin, acrylic reactive resin, formaldehyde resin, silicone resin, epoxy-polyamide resin, a mixture of polyester resin and isocyanate prepolymer, a mixture of polyester-polyol and polyisocyanate, and a mixture of polyurethane and polyisocyanate.

Details of these resins are described, e.g., in *Plastics Handbook,* published by Asakura Shoten.

It is also possible to use known electron beam-curable resins in the non-magnetic layer and the magnetic layers. Examples of such resins and manufacturing methods thereof are described in detail in JP-A-62-256219. The resins as described above can be used alone or as a combination of two or more thereof. Examples of the resin combination include a combination of polyurethane resin and at least one vinyl chloride-based resin selected from vinyl chloride resin, vinyl chloride-vinyl acetate copolymer, vinyl chloride-vinyl acetate-vinyl alcohol copolymer and vinyl chloride-vinyl acetate-maleic anhydride copolymer, and a combination of polyisocyanate with the combination as described above. The polyurethane resins used include those known, for example, polyesterpolyurethane, polyetherpolyurethane, polyetherpolyesterpolyurethane, polycarbonatepolyurethane, polyesterpolycarbonatepolyurethane and polycaprolactone-polyurethane. For enhancing dispersibility and durability, it is preferred to use a binder resin having at least one polar group selected from —COOM, —SO$_3$M, —OSO$_3$M, —P=O(OM)$_2$, —O—P=O(OM)$_2$ (wherein M is a hydrogen atom or an alkali metal base), —OH, —NR$_2$, —N$^+$R$_3$ (wherein R is a hydrocarbon group), epoxy group, —SH or —CN prepared by introducing such polar groups into each of the binder resins described above by copolymerization or addition reaction, if desired. The content of such polar groups in the binder is from $10^{-1}$ to $10^{-8}$ mole/g, preferably from $10^{-2}$ to $10^{-6}$ mole/g.

Examples of those binders usable in the invention include VAGH, VYHH, VMCH, VAGF, VAGD, VROH, VYES, VYNC, VMCC, XYHL, XYSG, PKHH, PKHJ, PKHC and PKFE produced by Union Carbide Co., MPR-TA, MPR-TA5, MPR-TAL, MPR-TSN, MPR-TMF, MPR-TS, MPR-TM and MPR-TAO produced by Nissin Chemical Industry Co., Ltd., 1000W, DX80, DX81, DX82, DX83 and 100FD produced by Denki Kagaku Kogyo K.K., MR-105, MR110, MR100 and 400X-110A produced by Nippon Zeon Co., Ltd., Nipporan N2301, N2302 and N2304 produced by Nippon Polyurethane Industry Co., Ltd., Pandex T-5105, T-R3080 and T-5201, Barnoc D-400 and D-210-80, and Crysbon 6109 and 7209 produced by Dainippon Ink & Chemicals, Inc., Vylon UR8200, UR8300, UR-8600, UR-5500, UR-4300, RV530 and RV280 produced by Toyobo Co., Ltd., Daiferamine 4020, 5020, 5100, 5300, 9020, 9022 and 7020 produced by Dainichiseika C. & C. Mfg. Co., Ltd., MX5004 produced by Mitsubishi Chemical Industries Ltd., Sanprene SP-150, TIM-3003 and TIM-3005 produced by Sanyo Chemical Corp., and Saran F310 and F210 produced by Asahi Chemical Industry Co., Ltd.

In the present magnetic layers, the binder is used in a proportion of 2 to 50 weight %, preferably 10 to 30 weight %, to the ferromagnetic powder used. More specifically, it is preferred to use as the binder a vinyl chloride copolymer in a proportion of 5 to 30 weight %, polyurethane resin in a proportion of 2 to 20 weight % and polyisocyanate in proportion of 2 to 20 weight % in combination. In the case of using polyurethane as a binder in the invention, it is preferred that the polyurethane has a glass transition temperature of −50 to 100° C., a breaking elongation of 100 to 2,000%, a breaking stress of 0.05 to 10 kg/cm$^2$, and a yield point of 0.05 to 10 kg/cm$^2$. The present magnetic recording medium is constructed of at least two layers. Therefore, needless to say, it is possible to vary the binder content, the proportions of vinyl chloride resin, polyurethane resin, polyisocyanate and other resins in the binder, the molecular weight and polar group content of each of resins forming the magnetic layer, or the physical characteristics of the resins as described above among the constituent layers including the non-magnetic layer, the uppermost magnetic layer and other lower magnetic layers, if needed. In this case, known arts of multiple magnetic layers are applicable. In the case of using different amounts of binders in the upper and lower magnetic layers and the non-magnetic layer respectively, for instance, it is effective to increase a binder content in the uppermost magnetic layer for reduction of abrasion at the magnetic layer surface, and an improved head touch on the recording medium can be achieved by increasing the binder content in the magnetic layers other than the uppermost magnetic layer or the non-magnetic layer and imparting flexibility to the magnetic recording medium.

Examples of the polyisocyanate usable in the invention include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates as condensation products of isocyanates. Commercially available products of the isocyanates include, e.g., Colonate L, Colonate HL, Colonate 2030, Colonate 2031, Millionate MR and Millionate MTL produced by Nippon Polyurethane Industry Co., Ltd., Takenate D-102, Takenate D-110N, Takenate D-200 and Takenate D-202 produced by Takeda Chemical Industries, Ltd., and Desmodur L, Desmodur IL, Desmodur N and Desmodur HL produced by Sumitomo Bayer Co., Ltd. In each of the non-magnetic layer and the magnetic layers, these products may be used alone or as a combination of at least two products utilizing a difference in curing reactivity.

[Non-magnetic Powder]

Non-magnetic powders used in the present non-magnetic layer can be selected from inorganic compounds, such as metal oxides, metal carbonates, metalsulfates, metal nitrides, metal carbides and metal sulfides. More specifically, aluminium oxide having an α-alumina content of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfates, barium sulfate and molybdenum disulfide can be used alone or as combinations of two or more thereof. Of these compounds, titanium dioxide, zinc oxide, iron oxide and barium sulfate are preferably used. In particular, titanium dioxide is preferred. The particle size of the non-magnetic powders is in the range of 0.005 to 2 μm. If desired, adjustment to such a particle size range may be made by combined use of non-magnetic powders differing in average particle size or independent use of a non-magnetic powder having a broad size distribution, thereby obtaining similar effects. In particular, the inorganic powders ranging in particle size from 0.01 to 0.2 μm are preferred. The tap density is from 0.05 to 2 g/ml, preferably from 0.2 to 1.5 g/ml. The water content is in the range of 0.1 to 5 weight %, preferably 0.2 to 3 weight %. The pH is from 2 to 11, and the pH range of 6 to 9 is preferred in particular. The specific surface area is in the range of 1 to 100 m$^2$/g, preferably 5 to 50 m$^2$/g, more preferably 7 to 40 m$^2$/g. The suitable crystallite size is from 0.01 to 2 μm. The oil absorptive capacity using dibutyl phthalate (DBP) is in the range of 5 to 100 ml/100 g, preferably 10 to 80 ml/100 g, more preferably 20 to 60 ml/100 g. The specific gravity is from 1 to 12, preferably from 3 to 6. Those non-magnetic powders may have any of acicular, spherical, polyhedral and tabular shapes. It is preferred that the ignition loss is at most 20 weight %. The Mohs hardness of the inorganic powder used in the invention is at least 4. It is preferred that those non-magnetic powders have the surface roughness factor in the range of 0.8 to 1.5, more preferably 0.9 to 1.2. The amount of stearic acid (SA) adsorbed is in the range of 1 to 20 μmol/m$^2$, preferably 2 to 15 μmol/m$^2$. It is preferred that the non-magnetic powders have heat of wetting with 25° C. water in the range of 200 to 600 erg/cm$^2$. It is also possible to use a solvent so far as the non-magnetic powders have heat of wetting with the solvent in the foregoing range. Further, it is appropriate that the quantity of water molecule present on the powder surface at 100 to 400° C. is from 1 to 10 molecules per 100 A. It is preferred to use non-magnetic powders the pH of which is in the range of 3 to 6 at the isoelectric point in water.

It is preferred to treat the surfaces of the non-magnetic powders with $Al_2O_3$, $SiO_2$, $TiO_2$, $ZrO_2$, $SnO_2$, $Sb_2O_3$ or ZnO. Of those oxides, $Al_2O_3$, $SiO_2$, $TiO_2$ and $ZrO_2$, especially $Al_2O_3$, $SiO_2$ and $ZrO_2$, are preferred from the viewpoint of dispersibility. These oxides may be used in combination or independently. For instance, such a surface treatment layer may be formed by coprecipitation of the desired oxides, or by providing an alumina layer first and then silica layer, or vise versa. In addition, the surface treatment layer formed may be porous depending on the intended purposes, but it is ordinarily preferred that the layer is uniform and dense.

Examples of non-magnetic powder usable in the invention include UA5600 and UA5605 produced by Showa Denko K.K., AKP-20, AKP-30, AKP-50, HIT-55, HIT-100 and ZA-G1 produced by Sumitomo Chemical Co., Ltd., G5, G7 and S-1 produced by Nippon Chemical Industrial Co., Ltd., TF-100, TF-120, TF-140 and R516 produced by Toda Kogyo Corp., TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680 and TY-50 produced by Ishihara Sangyo Co., Ltd., ECT-52, STT-4D, STT-30D, STT-30 and STT-65C produced by Titan Kogyo K.K. T-1 produced by Mitsubishi Materials Corp., NS-O, NS-3Y and NS-8Y produced by Nippon Shokubai Co., Ltd., MT-100S, MT-100T, MT-150W, MT-500B, MT-600B and MT-100F produced by Tayca Corp., FINEX-25, BF-1, BF-10, BF-20, BF-1L and BF-10P produced by Sakai Chemical Industry Co., Ltd., DEFIC-Y and DEFIC-R produced by Dowa Mining Co., Ltd., and Y-LOP produced by Titan Kogyo K.K., and burned products thereof.

Of those non-magnetic powders, titanium dioxide is preferred in particular. So the manufacturing methods thereof are described below in detail. As typical manufacturing methods of titanium dioxide, there are known a sulfuric acid method and a chlorine method. According to the sulfuric acid method, ilmenite as a raw ore is digested with sulfuric acid, and therefrom Ti and Fe are extracted as sulfates. From the extract, the iron sulfate is separated by crystallization, and the residual titanyl sulfate solution is purified by filtration. Then, the filtrate is hydrolyzed under heating to precipitate hydrated titanium dioxide. The precipitate is filtered off and washed, and therefrom impurities are removed by further washing. After addition of a grain-size modifier, the hydrated titanium oxide is burned at 80 to 1,000° C. to yield crude titanium dioxide. Whether the crude product obtained is rutile-type titanium dioxide or anatase-type titanium oxide depends on the kind of a nucleating agent added at hydrolysis. The crude titanium dioxide is ground, classified, and then subjected to surface treatment. Thus, the intended titanium dioxide is obtained. In the chlorine method, on the other hand, natural or synthetic rutile is used as raw ore. The ore is subjected to chloridization at a high temperature in a reductive condition, and thereby Ti and Fe in the ore are converted into $TiCl_4$ and $FeCl_2$ respectively. Upon cooling, the $FeCl_2$ is solidified, and separated from liquid $TiCl_4$. The crude $TiC_4$ thus obtained is purified by rectification, and thereto a nucleation agent is added. Then, it is made to instantaneously react with oxygen at a temperature of 1,000° C. or higher to yield crude titanium dioxide. To the crude titanium dioxide produced in the oxidative decomposition process, pigment properties are imparted by the same finishing treatment as in the sulfuric acid method. The surface treatment for finishing comprises the following steps: The crude titanium dioxide is ground in a dry condition, admixed with a dispersing agent and water, ground in a wet condition, and then centrifuged to separate coarse grains. Then, the slurry of fine grains is transferred into a surface treatment tank, and surface coating with metal hydroxide is performed. Specifically, the prescribed amount of aqueous solution containing a salt of Al, Si, Ti, Zr, Sb, Sn, or Zn is added to the slurry, and thereto an acid or an alkali is added for neutralization. Thus, the titanium dioxide grain surface is coated with the hydrated oxide(s) produced. The removal of water-soluble salt(s) as by-product(s) is effected by decantation, filtration and washing. The resulting slurry is subjected to pH adjustment, filtration and washing with pure water. The thus washed cake is dried with a spray dryer or a band dryer. The thus dried cake is ground with a jet mill to yield a final product. In addition to the aqueous system described above, $AlCl_3$ or $SiCl_4$ vapor is admitted through titanium dioxide powder and then steam is introduced therein to conduct the surface treatment with Al or Si.

Examples of organic powder as non-magnetic powder usable in the invention include acrylic-styrene resin powder, benzoguanamine resin powder, melamine resin powder, phthalocyanine pigments, polyolefin resin powder, polyester resin powder, polyamide resin powder, polyimide resin powder and polyfluoroethylene resin powder. The methods which can be adopted for manufacturing those powders are disclosed in JP-A-62-18564 and JP-A-60-255827.

The ratio of the non-magnetic powders to the binder used together ranges from 20:1 to 1:10 by weight and from 10:1 to 1:10 by volume. In particular, it is preferred that the volume of the binder is from 2 to 0.3 times the volume of the powders in the non-magnetic layer.

[Carbon Black]

Examples of carbon black usable in the present magnetic layers include furnace black for rubber use, thermal black for rubber use, carbon black for color use and acetylene black. It is preferred to use carbon black having its specific surface area in the range of 5 to 500 $m^2/g$, its DBP absorptive capacity in the range of 10 to 400 ml/100 g, its average particle size in the range of 5 to 300 m$\mu$, its pH in the range of 2 to 10, its water content in the range of 0.1 to 10 weight % and its tap density in the range of 0.1 to 1 g/ml. Specific examples of the carbon black usable in the invention include BLACKPEARLS 2000, 1300, 1000, 900, 800 and 700, and VULCAN XC-72 produced by Cabot Corp., #80, #60, #55, #50 and #35 produced by Asahi Carbon Co., Ltd., #2400B, #2300, #900, #1000, #30, #40 and #10B produced by Mitsubishi Chemical Corp., and CONDUCTEX SC and RAVEN 150, 50, 40 and 15 produced by Columbian Chemical Co.

In advance of its use, the carbon black may be surface-treated with a dispersing agent, a resin may be grafted on the carbon black, or the carbon black surface may be partly converted into graphite. Also, the carbon black may be dispersed into a binder before it is added to the magnetic coating composition. The carbon black can be used alone or as a combination. When the carbon black is mixed in the magnetic layer, a preferred proportion of carbon black to the ferromagnetic powder is from 0.1 to 30 weight %. The carbon black used in the magnetic layer has functions of preventing electrification, reducing a friction coefficient, imparting light-shielding property and increasing the film strength. The function of carbon black may be varied depending on the nature of the carbon black used. Therefore, the kind, amount and combination of carbon black used in the uppermost magnetic layer and the lower magnetic layer can be appropriately selected on the basis of the foregoing properties, such as the particle size, oil absorption, conductivity and pH to suite individual purposes of those layers. Details of the carbon black usable in the present invention can be referred, e.g., to *Carbon Black Binran* (which may be translated by the English title "Handbook of Carbon Black"), compiled by Carbon Black Association.

Examples of carbon black usable in the present non-magnetic layer include furnace black for rubber use, thermal black for rubber use, carbon black for color use and acetylene black. It is appropriate to use carbon black having its specific surface area in the range of 100 to 500 $m^2/g$, preferably 150 to 400 $m^2/g$, and its DBP absorptive capacity in the range of 20 to 400 ml/100 g, preferably 30 to 200 ml/100 g. The average particle size of the carbon black used is from 5 to 80 m$\mu$m (=nm), preferably from 10 to 50 m$\mu$m, more preferably from 10 to 40 m$\mu$m. Further, it is preferred that the pH, water content and tap density of the carbon black used are from 2 to 10, from 0.1 to 10 weight % and from 0.1 to 1 g/ml, respectively. Specific examples of the carbon black usable in the invention include BLACK-PEARLS 2000, 1300, 1000, 900, 800, 880 and 700, and VULCAN XC-72 produced by Cabot Corp., #3050B, #3150B, #3250B, #3750B, #3950B, #950, #650, #970B, #850B and MA-600 produced by Mitsubishi Chemical Corp., CONDUCTEX SC and RAVEN 8800, 8000, 7000, 5750, 5250, 3500, 2100, 2000, 1800, 1500, 1255 and 1250 produced by Columbian Chemical Co., and Ketjen Black EC produced by Akuzo Co.

In advance of its use, the carbon black may be surface-treated with a dispersing agent, a resin may be grafted on the carbon black, or the carbon black surface may be partly converted into graphite. Also, the carbon black may be dispersed into a binder before it is added to the coating composition.

The carbon black can be used in a proportion not more than 50 weight % to the non-magnetic powder as described above, and that not more than 40 weight % to the total weight of the non-magnetic layer. The carbon black as described above may be used alone or as combinations. Details of the carbon black usable in the present invention can be referred, e.g., to *Carbon Black Binran* (*which may be translated by the English title "Handbook of Carbon Black"*), compiled by Carbon Black Association.

[Abrasive]

Examples of the abrasives usable in the invention include known materials having Mohs hardness of at least 6, such as alumina having an α-alumina content of at least 90%, β-alumina, silicon carbide, chromium oxide, cerium oxide, α-iron oxide, corundum, artificial diamond, silicon nitride, titanium carbide, titanium dioxide, silicon dioxide and boron nitride. These abrasives can be used alone or as combinations. Further, these abrasives may be used in the form of complex (obtained by treating surface of one abrasive with another abrasive). Although those abrasives may sometimes contain compounds or elements other than their main components, they can function as abrasives as far as the proportion of their respective main components is 90 weight % or more. The average particle size of those abrasives is preferably from 0.01 to 2 μm. Adjustment to the particle size range may be made by combined use of abrasives having different particle sizes or independent use of an abrasive having a broad particle size distribution, if desired. It is advantageous that the abrasives used have their tap density in the range of 0.3 to 2 g/ml, their water content in the range of 0.1 to 5 weight %, their pH in the range of 2 to 11 and their specific surface area in the range of 1 to 30 $m^2/g$. The abrasives used in the invention may have any of acicular, spherical and cubic shapes. However, shapes sharpened in parts are advantageous from the viewpoint of abrasive capability. Examples of commercially available abrasives include AKP-20, AKP-30, AKP-50, HIT-50 and HIT-100 produced by Sumitomo Chemical Co., Ltd., G-5, G7 and S-1 produced by Nippon Chemical Industrial Co., Ltd., and TF100 and TF140 produced by Toda Kogyo Corp. Needless to say, it is possible to change abrasives added to the magnetic layers (upper and lower layers) and the non-magnetic layer, respectively, in kind, amount added and combination so as to suit the intended purpose. Those abrasives may be dispersed in advance into a binder and added to the magnetic coating composition. The number of abrasives present on the surface and sides of the magnetic layer of the magnetic recording medium of the invention is preferably at least 5 per 100 $μm^2$.

[Other Additives]

Compounds having a lubricating effect, an antistatic effect, a dispersing effect or a plasticizing effect can be used as other additives for the magnetic layers (uppermost and lower layers) and non-magnetic layer of the present magnetic recording medium. Examples of the compounds usable as such additives include molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, alkylphosphoric acid ester and alkali metal salts thereof, alkylsulfuric acid ester and alkali metal salts thereof, polyphenyl ether, fluorine-containing alkyl sulfuric acid ester and alkali metal salts thereof, monobasic fatty acid containing 10 to 24 carbon atoms (which may contain unsaturated bonds or may be branched) and metal salts of such a fatty acid (e.g., Li, Na, Ka and Cu salts), monohydric to hexahydric alcohol each containing 12 to 22 carbon atoms (which may have unsaturated bonds or may be branched), alkoxyalcohol containing 12 to 22 carbon atoms (which may have unsaturated bonds or branched chains), mono-, di- or trifatty acid ester produced by reaction of monobasic fatty acid containing 10 to 24 carbon atoms (which may have unsaturated bonds or may be branched) with one kind of alcohol chosen from monohydric to hexahydric alcohols each containing 2 to 12 carbon atoms (which may have unsaturated bonds or may be branched), ester of fatty acid and polyalkylene oxide monoalkyl ether, fatty acid amide containing 8 to 22 carbon atoms, and aliphatic amine containing 8 to 22 carbon atoms.

Specific examples of the compounds includes lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Further, non-ionic surfactants of alkylene oxide type, glycerin type, glycidol type and alkylphenol-ethylene oxide adduct type, cationic surfactants, such as cyclic amines, ester amides, quaternary ammonium salts, hydantoin derivatives, heterocyclic compounds, phosphoniums and sulfoniums, anionic surfactants containing acidic groups such as carboxyl, sulfo, phospho, sulfate and phosphate groups, and amphoteric surfactants, such as amino acids, aminosulfonic acids, sulfuric or phosphoric acid esters of amino alcohols, and alkyl betaine-type surfactants, can be used.

Details of the surfactants are described in *Kaimen Kasseizai Binran* (*which may be translated by the English title "Handbook of Surfactants"*), published by Sangyo Tosho K.K. The lubricants and antistatic agents as recited above are not always required to be pure, but may contain impurities, such as isomers, unreacted materials, by-products, decomposed matter and oxides. The content of such impurities is preferably 30 weight % or below, more preferably 10 weight % or below.

In the invention, it is possible to change the kinds and the amounts of lubricant and surfactant added to meet requirements for each of the non-magnetic and magnetic layers individually. For instance, it is thought that the use of fatty acids having different melting points in the non-magnetic layer and the magnetic layers permits controlling the ooze of the fatty acids from the layer surface, the use of esters having different boiling points and polarities in the non-magnetic layer and the magnetic layers permits controlling the ooze of the esters from the layer surface, adjustment of amounts of surfactants added to the non-magnetic layer and the magnetic layers enables enhancement of coating stability, and the lubricating effect can be elevated by adding a greater amount of lubricant to the non-magnetic layer. Needless to say, the cases described above should not be construed as limiting the scope of the invention. All or a part of additives used in the invention may be added in any step of process for preparing the magnetic coating composition. For instance, there may be cases where the additives are mixed with the ferromagnetic powder prior to the kneading process, they are added during the process of kneading the ferromagnetic powder, binder and solvent, they are added in the process of dispersion, they are added after the dispersion process, and they are added just before coating. On the other hand, simultaneous or successive application of all or a part of the additives to an already formed magnetic layer sometimes allows the desired purposes to be achieved. Further, in some cases, the magnetic layer surface may be coated with a lubricant after calendering or slitting operation.

Examples of commercially available lubricant products include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, caster oil-hydrogenated fatty acid, NAA-42, NAA-44, Cation SA, Cation MA, Cation AB, Cation BB, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60OR, Nonion OP-80R, Nonion OPO-85R, Nonion LT-221, Nonion ST-221, Nonion OT-221, Monogly MB, Nonion DS-60, Anon BF and Anon LG, butyl stearate, butyl laurate and erucic acid produced by NOF Corp., olleic acid produced by Kanto Kagaku Co., Ltd., FAL-205 and FAL-123 produced by Takemoto Oil & Fat Co., Ltd., TA-3, KF96, KF-96L, KF96H, KF410, KF420, KF965, KF54, KF50, KF56, KF907, KF851, X-22-819, X-22-822, KF905, KF700, KF393, KF857, KF860, KF865, X-22-980, KF-101, KF-102, KF-103, X-22-3710, X-22-3715, KF-910, and KF-3935 produced by Shin-Etsu Chemical Co., Ltd., and Duomine TDO produced by Lion Corp., BA-41G produced by Nisshin Oil Mills, Ltd.

[Organic Solvent]

In coating compositions for forming the present magnetic layers (uppermost and lower layers) and non-magnetic layer, organic solvents can be used in an appropriate proportion. Examples of the organic solvents usable include ketones such as acetone, methyl ethyl ketone, methyl isobutyl ketone, diisobutyl ketone, cyclohexanone, isophorone and tetrahydrofuran, alcohols such as methanol, ethanol, propanol, butanol, isobutyl alcohol, isopropyl alcohol and methylcyclohexanol, esters such as methyl acetate, butyl acetate, isobutyl acetate, isopropyl acetate, ethyl lactate and glycol acetate, glycol ethers such as glycol dimethyl ether, glycol monoethyl ether and dioxane, aromatic hydrocarbons such as benzene, toluene, xylene, and cresol and chlorobenzene, chlorinated hydrocarbons such as methylene chloride, ethylene chloride, carbon tetrachloride, chloroform, ethylene chlorohydrin and dichlorobenzene, N,N-dimethylformamide and hexane. These organic solvents may not always be 100% pure products, but may contain impurities including isomers, unreacted materials, by-products, decomposed matter, oxides and water. It is preferred that the proportion of such impurities is preferably at most 30%, more preferably at most 10%. In the invention, it is preferred that the organic solvents used in the magnetic layers (uppermost and lower layers) and the non-magnetic layer are same in kind. However, the solvent used may be different in amount between the magnetic and non-magnetic layers. For the non-magnetic layer, a solvent having high surface tension (e.g., cyclohexanone or dioxane) is used to improve the coating stability. Specifically, it is essential that the arithmetic mean of a solvent composition of the uppermost layer be higher than that of the lower layer. In order to enhance dispersibility, it is preferred for the solvent to have a high polarity to some extent, and the solvent composition containing solvents having dielectric constants of 15 or above in an amount of at least 50% is preferred. In addition, the solubility parameter of solvents used is preferably from 8 to 11.

[Thickness of Magnetic Recording Medium]

As to the thickness of the present magnetic recording medium, the thickness of a non-magnetic flexible support used is from 1 to 100 µm, preferably 4 to 80 µm, and the total thickness of magnetic and non-magnetic layers is from 1/100 to 2 times the thickness of the non-magnetic flexible support. Further, an under-coat layer may be provided between the non-magnetic flexible support and the non-magnetic layer for the purpose of adhesion improvement. The thickness of the under-coat layer is from 0.01 to 2 µm, preferably from 0.02 to 0.5 µm. In addition, the non-magnetic support may be coated with a backing layer on the side opposite to the magnetic layer. The thickness of the backing layer is from 0.1 to 2 µm, preferably from 0.3 to 1.0 µm. Known compositions for the under-coat and backing layers are usable in the invention.

[Support]

The support used in the invention may be any of supports hitherto used for magnetic recording media. Considering its magnetic layer-supporting role, the support is preferably a non-magnetic material. When the present magnetic recording medium is a magnetic tape, flexibility is required for the support, so a non-magnetic flexible support is ordinarily used.

Non-magnetic flexible supports usable in the invention include known films of polyesters such as polyethylene terephthalate and polyethylene naphthalate, polyolefins, cellulose triacetate, polycarbonate, polyamide, polyimide, polyamideimide, polysulfone, aramide and aromatic polyamide.

These support materials may undergo in advance corona discharge, plasma treatment, adhesion-increasing treatment, heat treatment and dust removal treatment. For attaining the present object, it is required for the support used in the invention to have a center-line average surface roughness (cut-off value: 0.25 mm) of at most 0.03 µm, preferably at most 0.02 µm, more preferably at most 0.01 µm. Besides being small in center-line average surface roughness, the present support is preferably free of coarse projections measuring 1 µm or above in height. The surface roughness dimensions can be adjusted freely by selecting sizes and amounts of fillers added to the support, if desired. Examples of such fillers include oxides and carbonates of Ca, Si and Ti, and organic fine powders such as particulate acrylic resin. The F-5 values of non-magnetic support used in the invention are preferably from 5 to 50 kg/mm$^2$ in the tape-running direction and preferably from 3 to 30 kg/mm$^2$ in the tape traverse direction (width direction). In general, the F-5 value is larger in the tape running direction than in the tape traverse direction. However, this needs not apply in special cases where the necessity of increasing the strength in the traverse direction arises.

The thermal shrinkage ratio of the support in both tape-running and traverse directions is preferably at most 3%, more preferably at most 1.5%, under heating at 100° C. for 30 minutes, and preferably at most 1%, more preferably at most 0.5%, under heating at 80° C. for 30 minutes. It is preferred for the support to have its breaking strength in the range of 5 to 100 kg/mm$^2$ in both the directions and its elastic modulus in the range of 100 to 2,000 kg/mm$^2$.

[Preparation Process of Coating Compositions]

The process of preparing coating compositions for forming constituent layers of the present magnetic recording medium, inclusive of the magnetic layers (uppermost and lower layers) and the non-magnetic layer, comprises a kneading step, a dispersing step and mixing steps provided before or after those steps, if desired. Each step may be constituted of at least two stages. Each of ingredients used for coating compositions, such as a ferromagnetic powder, a nonmagnetic powder, a binder, carbon black, an abrasive, an antistatic agent, a lubricant and a solvent, may be added at the beginning or in the course of every step. In addition, each ingredient may be divided into two or more portions, and added in separate steps. For instance, polyurethane resin may be separately added in the kneading step, dispersing step and mixing step for viscosity adjustment after the dispersion.

It goes without saying that hitherto known techniques for production may be applied to some steps in order to attain the present object. The use of a mighty kneading machine, such as a continuous kneader or a pressurized kneader, at the kneading step can ensure high residual magnetic flux density (Br) in the present magnetic recording medium. The details of kneading treatment are described in JP-A-1-106338 and JP-A-64-79274. On the other hand, in the case of preparing a coating composition for forming a non-magnetic layer, it is desirable to use a dispersion medium greater in specific gravity, and zirconia beads are suitable as such a dispersion medium.

[Coating Machine and Coating Method]

Examples of a coating machine and method applicable to production of the present magnetic recording medium having a multilayer structure are described below:

(1) A lower layer is coated first by the use of a coating machine usually applied in coating magnetic coating compositions, such as a gravure, roll, blade or extrusion coater. And while the lower layer is in a wet condition, the upper layer is coated thereon by the use of a pressurized support type extrusion coating machine as disclosed in JP-B-1-46186 (the term "JP-B" as used herein means an "examined Japanese patent publication), JP-A-60-238179 and JP-A-2-265672.

(2) An upper layer and a lower layer are coated almost simultaneously by the use of a coating head having 2 slits for passage of coating compositions as disclosed in JP-A-63-88080, JP-A-2-17971 and JP-A-2-265672.

(3) An upper layer and a lower layer are coated almost simultaneously by the use of a backup roll-attached extrusion coating machine as disclosed in JP-A-2-174965.

In addition, it is desirable to apply a sheering stress to the coating composition in the interior of a coating head by the use of the method disclosed in JP-A-62-95174 or JP-A-1-236968 for the purpose of preventing electromagnetic characteristics of the magnetic recording medium to be formed from degrading due to agglomeration of magnetic particles. Further, it is preferred that the coating compositions have their viscosity in the numerical range disclosed in JP-A-3-8471. In the process of producing a magnetic recording medium according to the invention, it is preferred to perform treatment for creating a strongly oriented state in the recording medium. For effecting such a treatment, it is appropriate to apply a magnetic field generated from a combination of solenoid of at least 1,000 G and cobalt magnet of at least 2,000 G placed so that the same poles thereof face each other, and further to provide a moderately drying step prior to the orientation treatment step so as to attain the optimum orientation after drying. In the case of a magnetic disk as an embodiment of the invention, on the other hand, it is rather required to perform orientation treatment for randomizing the orientation. Further, in order to vary the orientation direction from the uppermost magnetic layer to the lower magnetic layer, it is not always necessary for the orientation direction to be in the length direction, and that in-plane direction, but the orientations in the vertical direction and the traverse direction may be adopted.

Furthermore, a heat-resistant plastic roll, such as a roll made from epoxy resin, polyimide, polyamide or polyimideamide, is used in calendering treatment. A pair of metal rolls can also be used for the treatment. The treatment temperature is preferably not lower than 70° C., more preferably 80° C. or above, and the suitable linear pressure applied is preferably at least 200 kg/cm, more preferably at least 300 kg/cm. The coefficients of friction of the magnetic layer surface and the backing layer surface of the present magnetic recording medium against SUS 420J is preferably 0.5 or below, more preferably 0.3 or below, and the surface resistibility is preferably from $10^4$ to $10^{12}$ Ω/sq. The elastic modulus of the magnetic layer under 0.5% elongation is from 100 to 2,000 kg/mm² in each of running and traverse directions, and the breaking strength is preferably from 1 to 30 kg/cm². The elastic modulus of the magnetic recording medium in each of running and traverse directions is preferably from 100 to 1,500 kg/mm², the residual elongation is preferably at most 0.5%, and the thermal shrinkage ratio at all temperatures of no higher than 100° C. is preferably at most 1%, more preferably at most 0.5%, still more preferably at most 0.1%. The glass transition temperature of the magnetic layer (the maximum point of loss elastic modulus in the kinetic viscoelasticity measurement made at 110 Hz) is preferably from 50° C. to 120° C., and that of the non-magnetic layer is preferably from 0° C. to 100° C. The loss elastic modulus is preferably from $1\times10^8$ to $8\times10^9$ dyne/cm², and the loss tangent is preferably at most 0.2. When the loss tangent is too great, a tackiness trouble tends to occur.

The content of residual solvent in the magnetic layer is preferably 100 mg/m² or below, more preferably 10 mg/m² or below, and it is advantageous that the residual solvent content in the second layer (i.e., the uppermost magnetic layer) is lower than that in the first layer (i.e., the lower magnetic layer). The porosity of non-magnetic layer and that of magnetic layer are both preferably 30 volume % or below, more preferably 20 volume % or below. The smaller porosity is more favorable for achieving high output, but the porosity may be increased up to a point depending on the desired purpose. For instance, in the case of repetition use-oriented magnetic media for data recording, the greater porosity is more favorable for ensuring running durability. As to the magnetic characteristics of the present magnetic recording medium, the squareness ratio in the tape-running direction is at least 9, 70, preferably at least 0.80, more preferably at least 0.90, when measured in a magnetic field of 5 KOe. And it is preferred that the squareness ratios in two directions perpendicular to the tape-running direction are at most 80% of the squareness ratio in the tape-running direction. The SFD (Switching Field Distribution) of the magnetic layer is preferably 0.6 or below. The center-line surface roughness Ra (cut-off value: 0.25 mm) of the magnetic layer is preferably from 1 to 10 nm, but it is desired that the Ra value be determined appropriately depending on the intended purpose. For instance, the smaller Ra value is preferred for improvement of electromagnetic characteristics, while the greater Ra value is preferred for improvement of running durability. Further, it is preferred that the RMS (root-mean-square) surface roughness RRMS determined by evaluation with AFM (atomic force microscope) is within the range of 2 to 15 nm.

The present magnetic recording medium has the upper and lower magnetic layers and, if desired, the non-magnetic layer, and it is possible to vary physical properties from layer to layer depending on the desired purpose. For instance, high elastic modulus is conferred on the magnetic layer to improve the running durability, and at the same time the elasticity modulus of the non-magnetic layer is rendered lower than that of the magnetic layer to ensure a desirable touch of a head on the magnetic recording medium. What physical properties should be imparted to each of two or more magnetic layers individually can be determined by referring to known arts of magnetic layers having multilayer structures.

Now, the invention will be illustrated in more detail by reference to the following examples, but these examples should not be construed as limiting the scope of the invention in any way. Additionally, all "parts" in the following examples are by weight unless otherwise noted.

EXAMPLES 1 TO 4 AND

COMPARATIVE EXAMPLES 1 to 3

(1) Coating composition for uppermost magnetic layer:

Fine powder of ferromagnetic metal 100 parts
Composition: Fe/Co = 80/20 by atomic %,
Y content = 4.5 weight % of Fe,
Al content = 3.5 weight % of Fe,
Hc: 190 KA/m,
Specific surface area determined by BET: 54 m²/g,
Average major axis length: 0.07 μm,
Crystallite size: 120 A,
(Acicular ratio: 5.8)

-continued

| | |
|---|---|
| δs: 120 Am²/kg | |
| Vinyl chloride copolymer | 12 parts |
| (MR-110, a product of Nippon Zeon Co., Ltd.) | |
| Polyesterpolyurethane resin | 5 parts |
| neopentyl glycol/caprolactonepolyol/MDI = 0.9/2.6/1 | |
| —SO₃Na group content: 1 × 10⁻⁴ eq/g | |
| α-Alumina (particle size: 0.18 μm) | 5 parts |
| Carbon black (particle size: 0.10 μm) | 0.5 parts |
| Butyl stearate | 1 parts |
| Stearic acid | 2 parts |
| Methyl ethyl ketone | 90 parts |
| Cyclohexanone | 30 parts |
| Toluene | 60 parts |
| (2) Coating Composition of lower magnetic layer: | |
| Co-replaced barium ferrite | 100 parts |
| Hc: 276.5 KA/m, | |
| Specific surface area determined by BET: 60 m²/g, | |
| Tabular diameter: 35 nm | |
| Tabular thickness: 9 nm | |
| δs: 55 Am²/kg | |
| Vinyl chloride copolymer | 12 parts |
| (MR-110, a product of Nippon Zeon Co., Ltd.) | |
| Polyesterpolyurethane resin | 5 parts |
| neopentyl glycol/caprolactonepolyol/MDI = 0.9/2.6/1 | |
| —SO₃Na group content: 1 × 10⁻⁴ eq/g | |
| Butyl stearate | 1 parts |
| Stearic acid | 2 parts |
| Methyl ethyl ketone | 90 parts |
| Cyclohexanone | 30 parts |
| Toluene | 60 parts |
| (3) Coating Composition of non-magnetic Layer: | |
| α-Fe₂O₃ as non-magnetic powder | 80 parts |
| Average major axis length: 0.1 μm | |
| Specific surface area determined by BET: 48 m²/g, | |
| pH: 8, | |
| Fe₂O₃ content: at least 90% | |
| DBP absorptive capacity: 27 to 30 ml/100 g | |
| Surface treatment agent: Al₂O₃ | |
| Carbon black | 20 parts |
| Average primary particle size: 16 μm | |
| DBP absorptive capacity: 80 ml/100 g | |
| pH: 8.0 | |
| Specific surface area determined by BET: 250 m²/g | |
| Volatile matter: 1.5% | |
| Vinyl chloride copolymer | 12 parts |
| (MR-110, a product of Nippon Zeon Co., Ltd.) | |
| Polyesterpolyurethane resin | 5 parts |
| neopentyl glycol/caprolactonepolyol/MDI = 0.9/2.6/1 | |
| —SO₃Na group content: 1 × 10⁻⁴ eq/g | |
| Butyl stearate | 1 parts |
| Stearic acid | 1 parts |
| Methyl ethyl ketone | 100 parts |
| Cyclohexanone | 50 parts |
| Toluene | 50 parts |

The ingredients for each of the foregoing three compositions were kneaded by means of a continuous kneader, and then dispersed with a sandmill. To the dispersion prepared for the non-magnetic layer was added 1 parts of polyisocyanate (Colonate L, trade name, a product of Nippon Polyurethane Industry Co., Ltd.), while 3 parts of Colonate L was added to each of the dispersions prepared for the uppermost and lower magnetic layers. To each of the resulting dispersions was further added 40 parts of a 1:1 mixture of methyl ethyl ketone and cyclohexanone. The thus prepared compositions were each passed through a filter having an average pore size of 1 μm, thereby preparing coating compositions for the non-magnetic, uppermost magnetic and lower magnetic layers respectively.

On a 6 μm-thick polyethylene terephthalate support having a center-line surface roughness (cut-off value: 0.25 nm) of 0.01 μm, the coating compositions thus prepared were coated using a simultaneous multilayer coating technique. Specifically, the coating composition for forming the non-magnetic layer was coated on the support so to have a thickness as set forth in Table 1 after drying, and immediately thereafter the coating composition for the lower magnetic layer and the coating composition for the uppermost magnetic layer were simultaneously double-coated on the non-magnetic layer so to have a thickness of each layer as set forth in Table 1 after drying. While both of the magnetic layers were in a wet condition, they were subjected to magnetic alignment treatment using a combination of a cobalt magnet having a magnetic force of 3,000 G and solenoid having a magnetic force of 1,500 G. After drying, the support coated with those three layers was subjected to surface treatment using a 7-stage calender constructed of metal rolls alone at a temperature of 90° C. The thus produced magnetic media were each slit into strips having a width of ½ inch, thereby making magnetic tapes.

More specifically, tape samples varying in Hc of magnetic powder used and thickness of each constituent layer were prepared in Examples 1 to 4 and Comparative Examples 1 to 3. In Example 2, the Hc of the uppermost magnetic layer was 213 kA/m, which was close to 316 kA/m as the maximum value. In Example 3, on the other hand, the Hc of the uppermost magnetic layer was 166 kA/m, which was close to 158 kA/m defined as the minimum value, and further the uppermost magnetic layer had a great thickness of 0.4 μm. In Example 4, no non-magnetic layer was provided underneath the lower magnetic layer. In view of this embodiment, the non-magnetic underlayer is not essential to the invention.

On the other hand, the tape sample prepared in Comparative Example 1 was a traditional magnetic tape, and the tape sample prepared in Comparative Example 2 was a case where the Hc of the uppermost magnetic layer was 330 kA/m and too high. In the tape sample prepared in Comparative Example 3, the Hc of the lower magnetic layer was 146 kA/m and lower than the lower limit of Hc in the case where the Bs of the recording head used was 1.2 [T].

Each tape sample was wound to a length of 580 m in a 3480-type cartridge to prepare a tape cartridge.

[Evaluation Methods]

(1) Hc

Samples were prepared by coating each uppermost magnetic layer coating composition in a single layer and each lower magnetic layer coating composition in a single layer respectively, and coercive forces (Hc) thereof were each measured with a vibration sample magnetometer (made by Toei Industry Co., Ltd.) under a condition that Hm was set at 10 kOe (790 kA/m).

(2) Data Signal C/N Ratio and Servo Error Rate

As servo signals, signals whose recording wavelength was 2 μm were recorded with a thin-film head having Bs of 1.7 T, a gap space of 0.5 μm and a track width of 80 μm.

As data signals, signals whose recording wavelength was 0.5 μm were recorded on each of the previously servo-written tapes by means of a MIG head having Bs of 1.2 T, a gap space of 0.25 nm and a track width of 66 μm. For reproduction of signals was used a shield-type MR head having an element thickness of 20 nm, a shield gap of 0.3 μm and a track width of 22 μm. The reproduction of servo signals and the recording and reproduction of data signals were performed at a head/tape relative velocity of 5 m/sec.

The C/N ratio of data signals whose recording wavelength was 0.5 μm was measured with a spectrum analyzer made by Shibasoku.

With respect to the servo signals, errors were measured.

The results obtained are shown in Table 1.

TABLE 1

| Constitutional elements | | Example | | | | Comparative Example | | |
|---|---|---|---|---|---|---|---|---|
| | | 1 | 2 | 3 | 4 | 1 | 2 | 3 |
| Bs of Data recording head | [T] | 1.2 | 1.2 | 1.2 | 1.2 | 1.2 | 1.2 | 1.2 |
| Hc of Upper-most layer | [KA/m] | 190 | 213 | 166 | 190 | 146 | 330 | 190 |
| Hc of Lower layer | [KA/m] | 276.5 | 205 | 276.5 | 276.5 | 146 | 276.5 | 146 |
| Uppermost layer thickness | [μm] | 0.1 | 0.07 | 0.4 | 0.1 | 0.6 | 0.1 | 0.1 |
| Lower layer thickness | [μm] | 0.2 | 0.5 | 0.7 | 2.5 | 2.5 | 0.2 | 0.2 |
| Non-magnetic layer thickness | [μm] | 1.2 | 1.2 | 1.2 | — | — | 1.2 | 1.2 |
| Hc of magnetic powder in uppermost layer | [KA/m] | 190 | 207 | 160 | 190 | 148 | 320 | 190 |
| Hc of magnetic powder in lower layer | [KA/m] | 276.5 | 200 | 273 | 276.5 | 144 | 276.5 | 144 |
| C/N ratio of data signals | [dB] | 5.6 | 4.3 | 2.9 | 3.8 | 0 | −1.5 | 0.5 |
| Servo error rate | | $6 \times 10^{-6}$ | $1 \times 10^{-5}$ | $4 \times 10^{-5}$ | $5 \times 10^{-5}$ | $1 \times 10^{-3}$ | $8 \times 10^{-3}$ | $9 \times 10^{-4}$ |

As can be seen from Table 1, both high C/N ratio of data signals and low error rate of servo signals are attained by Example 1. Similarly, the effects of the invention are achieved in Examples 2 to 4.

The data shown in Table 1 indicate that the magnetic recording media according to the invention can ensure not only high C/N ratio for data signals but also low error rate for servo signals.

The magnetic recording media according to the invention can achieve both highly accurate servo write and higher recording density.

The entire disclosure of each and every foreign patent application from which the benefit of foreign priority has been claimed in the present application is incorporated herein by reference, as if fully set forth herein.

What is claimed is:

1. A magnetic recording medium comprising:
   a support; and
   at least two magnetic layers which include an uppermost magnetic layer for recording information and a lower magnetic layer for recording servo signals,
   wherein the uppermost magnetic layer has a coercive force Hc(U) [KA/m] at most 265 times as much as a saturated magnetic flux density Bs[T] of a recording head used for information recording, and the lower magnetic layer has a coercive force Hc(L) [KA/m] at least 159 times as much as the saturated magnetic flux density Bs[T] of the recording head used for information recording.

2. The magnetic recording medium as claimed in claim 1, wherein the coercive force of the uppermost magnetic layer Hc(U) is 140 KA/m or more.

3. The magnetic recording medium as claimed in claim 1, wherein the coercive force of the uppermost magnetic layer Hc(U) is from 158 KA/m to 316 KA/m.

4. The magnetic recording medium as claimed in claim 1, wherein the uppermost magnetic layer has a thickness of from one-tenth to one time the shortest recording wavelength of information signals to be recorded in the uppermost magnetic layer and the lower magnetic layer has a thickness of 0.05 to 3 μm.

5. The magnetic recording medium as claimed in claim 1, which further comprises a non-magnetic layer containing a non-magnetic powder and having a thickness of 0.3 to 3 μm under the at least two magnetic layers, wherein the lower magnetic layer has a thickness of 0.05 to 0.5 μm.

6. The magnetic recording medium as claimed in claim 1, wherein the lower magnetic layer for recording servo signals is located just under the uppermost magnetic layer for recording information.

* * * * *